(12) United States Patent
Kanauchi et al.

(10) Patent No.: US 8,442,026 B2
(45) Date of Patent: May 14, 2013

(54) MOBILE COMMUNICATION METHOD AND MOBILE STATION

(75) Inventors: Masashi Kanauchi, Yokosuka (JP); Hiroaki Yamagishi, Yokohama (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 166 days.

(21) Appl. No.: 13/058,104

(22) PCT Filed: Aug. 7, 2009

(86) PCT No.: PCT/JP2009/064030
§ 371 (c)(1),
(2), (4) Date: Jun. 1, 2011

(87) PCT Pub. No.: WO2010/016574
PCT Pub. Date: Feb. 11, 2010

(65) Prior Publication Data
US 2011/0235580 A1 Sep. 29, 2011

(30) Foreign Application Priority Data
Aug. 8, 2008 (JP) ................................. 2008-205996

(51) Int. Cl.
*H04J 3/24* (2006.01)
(52) U.S. Cl.
USPC .......................................... 370/349; 370/352
(58) Field of Classification Search .................. 370/352, 370/353, 354, 349, 310.2, 328, 338
See application file for complete search history.

(56) References Cited

U.S. PATENT DOCUMENTS

2009/0296654 A1* 12/2009 Bennett et al. ................ 370/331
2012/0069731 A1* 3/2012 Tooher et al. ................. 370/221

FOREIGN PATENT DOCUMENTS

| WO | 2006/138019 A2 | 12/2006 |
| WO | 2007/054501 A1 | 5/2007 |
| WO | 2007/079582 A1 | 7/2007 |

OTHER PUBLICATIONS

Office Action for Mexican Application No. MX/a/2011/001509 mailed on Aug. 28, 2012, with English translation thereof (4 pages).
Office Action for Japanese Application No. 2008-205996 mailed Oct. 25, 2011, with English translation thereof (5 pages).
NTT DOCOMO, "CS fallback procedure," 3GPP TSG RAN WG2 LTE RRC Ad Hoc, Tdoc R2-082962, Jun. 5-6, 2008, 13 pages.
LG Electronics Inc., "Considerations on CS fallback," 3GPP TSG-RAN WG2 RRC Adhoc, R2-083005, Jun. 5-6, 2008, 2 pages.

(Continued)

*Primary Examiner* — Brenda H Pham
(74) *Attorney, Agent, or Firm* — Osha Liang LLP (57) ABSTRACT

A mobile communication method according to the present invention includes the steps of: establishing a first radio link between the "LTE-AS" and the eNB in response to the "Service Request" received from the "EMM"; transmitting, from the "UMTS-AS" to the "MM/GMM", the "reconnect request", after the completion of the switching process from the mobile communication system of the LTE scheme to the mobile communication system of the UMTS scheme, when the "LTE-AS" detects RLF within a first predetermined period after receiving the switching command instructing performance of the switching process; and not transmitting, from the "MM/GMM" to the "UMTS-AS", the "Service Request" responding to the "reconnect request", when the mobile station UE has not performed a packet communication in the mobile communication system of the LTE scheme before a start of the switching process.

2 Claims, 4 Drawing Sheets

OTHER PUBLICATIONS

3GPP TS 23.272 V10.2.1, Jan. 2011, "3rd Generation Partnership Project; Technical Specification Group Services and System Aspects; Circuit Switched (CS) fallback in Evolved Packet System (EPS); Stage 2 (Release 10)," 79 pages.

3GPP TS 24.301 V10.1.0, Dec. 2010, "3rd Generation Partnership Project; Technical Specification Group Core Network and Terminals; Non-Access-Stratum (NAS) protocol for Evolved Packet System (EPS); Stage 3 (Release 10)," 305 pages.

3GPP TS 36.331 V10.0.0, Dec. 2010, "3rd Generation Partnership Project; Technical Specification Group Radio Access Network; Evolved Universal Terrestrial Radio Access (E-UTRA); Radio Resource Control (RRC); Protocol specification (Release 10)," 276 pages.

International Search Report issued in PCT/JP2009/064030, mailed on Nov. 10, 2009, with translation, 4 pages.

Written Opinion issued in PCT/JP2009/064030, mailed on Nov. 10, 2009, with translation, 7 pages.

International Preliminary Report on Patentability issued in PCT/JP2009/064030, issued Mar. 8, 2011, with translation, 9 pages.

* cited by examiner

MOBILE COMMUNICATION METHOD AND MOBILE STATION

TECHNICAL FIELD

The present invention relates to a mobile communication method in which a mobile station location-registered on a mobile communication system of a first communication scheme starts a circuit-switched communication in a mobile communication system of a second communication scheme, and relates also to a mobile station including a first protocol function for the first communication scheme, a second protocol function for the first communication scheme, a first protocol function for the second communication scheme, and a second protocol function for the second communication scheme.

BACKGROUND ART

In a mobile communication system represented by the LTE (Long Term Evolution) scheme including only a "Packet-switched network (PS Network)", it is common to implement voice communication via the VoIP (Voice over IP) that transmits and receives packets loaded with voice codec.

However, in a mobile communication system of the UMTS (Universal Mobile Telecommunications System) scheme having an existing circuit-switched network (CS Network), the provision of voice communication via the VoIP has many technical hurdles in view of communication continuity (handover process, etc.) with the usual voice communication.

Further, if a service is provided only through a circuit-switched network, the service may become "unusable" in a packet-switched network.

Therefore, in order to perform circuit-switched communication such as voice communication in a packet-switched network, there is known a method in which a visitor is moved to a mobile communication system having a circuit-switched network, and then circuit-switched communication is performed.

The method is called "CS Fallback (CSFB)" when executed between a mobile communication system of the LTE scheme and a mobile communication system of the UMTS scheme, between a mobile communication system of the LTE scheme and a mobile communication system of the GSM scheme, or else between a mobile communication system of the LTE scheme and a mobile communication system of the CDMA 2000 scheme.

The operation executed in the case of a mobile station location-registered on a mobile communication system of a first communication scheme (for example, the LTE scheme) including only a packet-switched network, and then falling back to a mobile communication system of a second communication scheme (for example, the UMTS scheme, the GSM scheme, or the CDMA 2000 scheme) having a circuit-switched network to start the circuit-switched communication is as follows.

Firstly, in a mobile station UE, a NAS protocol function (for example, EMM) of the first communication scheme transmits a "circuit-switched outgoing call request signal (Service Request)", to an AS protocol function (for example, LTE-AS) of the first communication scheme.

Secondly, in the mobile station UE, the AS protocol function of the first communication scheme transmits a "Fallback request signal (Service Request)" for the circuit-switched network, to the packet-switched network.

Thirdly, the packet-switched network transmits the "Handover instruction" or the "RAT change request" for the circuit-switched network, to the mobile station.

Fourthly, the mobile station transmits the outgoing call signal for circuit-switched communication, to the circuit-switched network.

SUMMARY OF THE INVENTION

Problems to be Solved by the Invention

Here, when the mobile station detects a cell of the mobile communication system of the second communication scheme in a cell search process after detecting that a radio link is out of synchronization (RLF: Radio Link Failure) in the above-mentioned operation (that is, the CSFB process), the AS protocol function (for example, UMTS-AS) of the second communication scheme is configured to transmit a "Reconnection request (the reconnect request)" of a PS domain to the NAS protocol function (for example, MM/GMM) of the second communication scheme, after the completion of the handover process or the RAT change process.

However, the mobile communication system of the second communication scheme is configured to perform the voice communication performed in the mobile communication system of the first communication system via VoIP (packet-switched communication) via circuit-switched communication, in the CSFB process. Therefore, there is a problem that, regardless of the fact that a bearer of the PS domain which is established in the mobile communication system of the first communication system is not required, the "Reconnection process (reconnect)" of the PS domain is performed.

Therefore, the present invention has been achieved in view of the above-described problems, and an object thereof is to provide a mobile communication method in which the unnecessary reconnection process is not performed in the CSFB process, and also to provide a mobile station.

Means for Solving the Problem

A first aspect of the present invention is summarized as a mobile communication method in which a mobile station location-registered on a mobile communication system of a first communication scheme starts a circuit-switched communication in a mobile communication system of a second communication scheme, including the steps of: establishing a first radio link between a first protocol function for the first communication scheme in the mobile station and a radio access apparatus of the first communication scheme in response to a first service request received from a second protocol function for the first communication scheme in the mobile station; transmitting, from a first protocol function for the second communication scheme to the second protocol function for the second communication scheme, a reconnect request, after completion of a switching process from the mobile communication system of the first communication scheme to the mobile communication system of the second communication scheme, when the first protocol function for the first communication scheme detects that the first radio link is out of synchronization within a first predetermined period after receiving a switching command instructing performance of the switching process; not transmitting, from the second protocol function for the second communication scheme to the first protocol function for the second communication scheme, a second service request responding to the reconnect request, when the mobile station does not perform a packet communication in the mobile communication system of the first communication scheme before the start of the switching process; transmitting, from the second protocol function for the second communication scheme to the first protocol function for the second communication scheme, a service request for the circuit-switched communication in response to a received outgoing call signal for the circuit-switched communication; and establishing a second radio link between the second protocol function for the second communication scheme and a radio access apparatus of the second communication scheme in response to the service request for the circuit-switched communication.

A second aspect of the present invention is summarized as a mobile station including: a first protocol function for a first communication scheme; a second protocol function for the first communication scheme; a first protocol function for a second communication scheme; and a second protocol function for the second communication scheme, wherein the first protocol function for the first communication scheme is configured to establish a first radio link with a radio access apparatus of the first communication scheme in response to a first service request received from the second protocol function for the first communication scheme; the first protocol function for the second communication scheme is configured to transmit, to the second protocol function for the second communication scheme, a reconnect request, after completion of a switching process from a mobile communication system of the first communication scheme to a mobile communication system of the second communication scheme, when the first protocol function for the first communication scheme detects that the first radio link is out of synchronization within a first predetermined period after receiving a switching command instructing performance of the switching process; the second protocol function for the second communication scheme is configured not to transmit, to the first protocol function for the second communication scheme, a second service request responding to the reconnect request, when the mobile station does not perform a packet communication in the mobile communication system of the first communication scheme before the start of the switching process; the second protocol function for the second communication scheme is configured to transmit, to the first protocol function for the second communication scheme, a service request for the circuit-switched communication in response to a received outgoing call signal for the circuit-switched communication; and the second protocol function for the second communication scheme is configured to establish a second radio link with a radio access apparatus of the second communication scheme in response to the service request for the circuit-switched communication.

Effect of the Invention

As has been described so far, the present invention is able to provide a mobile communication method in which the unnecessary reconnection process is not performed in the CSFB process, and also to provide a mobile station.

BEST MODES FOR CARRYING OUT THE INVENTION (Mobile Communication System According to First Embodiment of the Present Invention)

With reference to FIG. 1 through FIG. 5, a mobile communication system according to a first embodiment of the present invention will be explained.

Figure 1:
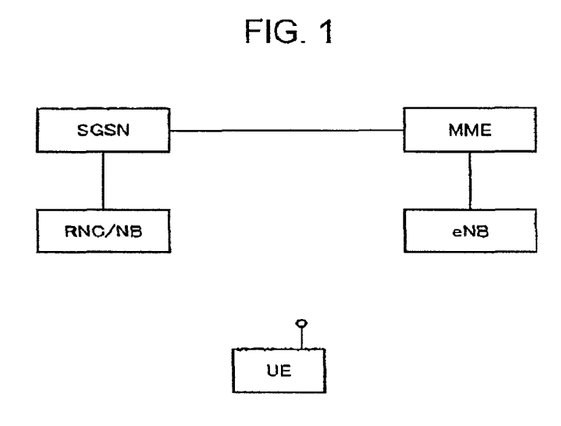
FIG. 1 is a diagram showing the entire configuration of a mobile communication system according to a first embodiment of the present invention.

As shown in FIG. 1, a mobile communication system according to the embodiment includes a first gateway apparatus P-GW (PDN-Gateway), a second gateway apparatus S-GW (Serving Gateway), a mobile switching center MME of the LTE scheme (the first communication scheme), a radio access apparatus (radio base station) eNB of the LTE scheme, a mobile switching center SGSN for packet communication of the UMTS scheme (the second communication scheme), and a radio access apparatus (radio control apparatus and radio base station) RNC/NB of the UMTS scheme.

In this embodiment, the LTE system is used as the first communication scheme and the UMTS system is used as the second communication scheme; however, the present invention is not limited to this case.

That is, if the mobile communication system of the first communication scheme includes only a packet-switched network (PS network, PS domain) and the mobile communication system of the second communication scheme includes a packet-switched network (PS network, PS domain) and a circuit-switched network (CS network, CS domain), any communication scheme can be used as the first communication scheme and the second communication scheme.

Figure 2:
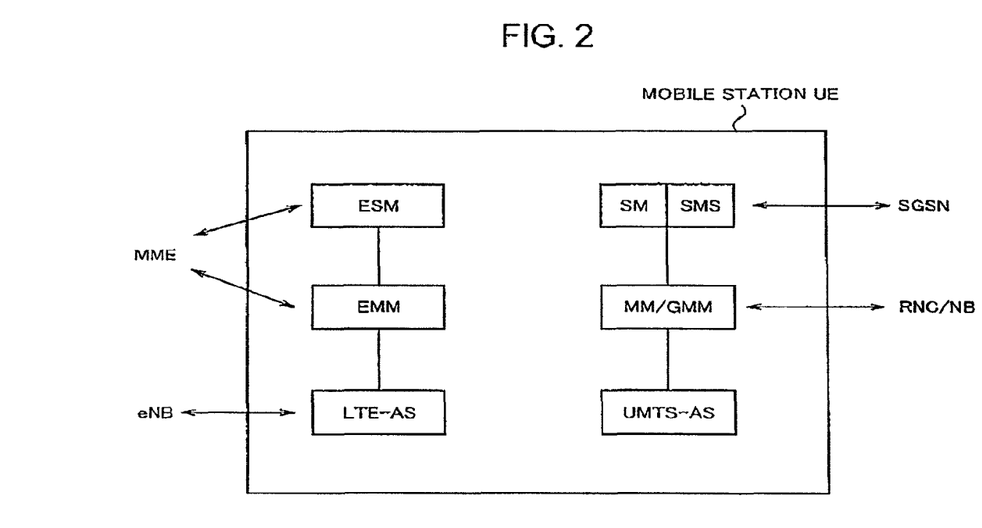
FIG. 2 is a functional block diagram of a mobile station according to the first embodiment of the present invention.

As shown in FIG. 2, the mobile station UE includes an "ESM", an "EMM (the second protocol function for the first communication scheme)", and an "LTE-AS (the first protocol function for the first communication scheme)" as the functions of the LTE scheme, and an "SM/SMS", an "MM/GMM (the second protocol function for the second communication scheme)", and an "UMTS-AS (the first protocol function for the second communication scheme)" as the functions of the UMTS scheme.

Here, the "LTE-AS" and the "UMTS-AS" are configured to perform a process corresponding to the AS protocol (the first protocol), which terminates between the mobile station UE and the radio base station eNB/NB.

Further, the "EMM" and the "MM/GMM" are upper protocols of the AS protocol (the first protocol) and are configured to perform a process corresponding to the NAS protocol (the second protocol), which terminates between the mobile station UE and the mobile switching center MME/SGSN.

Hereinafter, with reference to FIG. 3 to FIG. 5, an operation of the mobile communication system according to the first embodiment of the present invention will be explained.

Firstly, with reference to FIG. 3, a first operation of the mobile communication system according to the first embodiment of the present invention will be explained.

Figure 3:
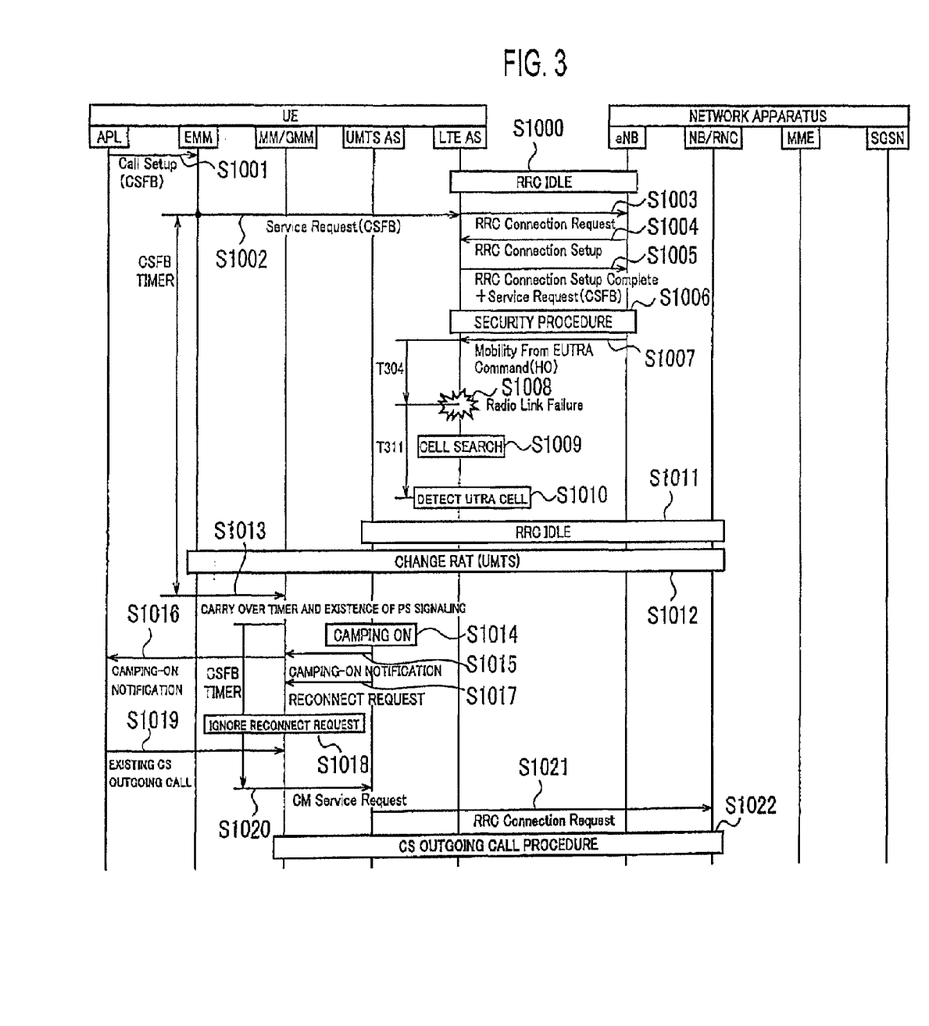
FIG. 3 is a sequence diagram showing an operation of the mobile communication system according to the first embodiment of the present invention.

As shown in FIG. 3, in step S1000, the mobile station UE is in the "Preservation state", wherein the mobile station UE is location-registered on the mobile communication system of the LTE scheme, an RRC connection (the first radio link) for specific communication between the mobile station UE and a specific connection destination APN is not established between the "LTE-AS" and the radio base station eNB (RRC Idle), and a connection (bearer) for the specific communication between the mobile station UE and the specific connection destination APN is established between the first gateway apparatus P-GW and the second gateway apparatus S-GW.

In step S1001, the "APL (Application function)" of the mobile station UE requests the start of the circuit-switched communication (that is, requests the performance of the CSFB process) by transmitting a "Call Setup (CSFB)" to "EMM".

In step S1002, the "EMM" transmits a "Service Request (the first service request)" to the "LTE-AS" requesting the start of the circuit-switched communication (that is, to perform the CSFB process) in the mobile communication system of the UMTS scheme after returning from the "Preservation state". Here, the "EMM" starts a CSFB timer (predetermined timer).

In step S1003, the "LTE-AS" transmits an "RRC Connection Request" to the radio base station eNB, and in step S1004, the radio base station eNB transmits an "RRC Connection Setup" to the "LTE-AS".

In step S1005, the "LTE-AS" transmits an "RRC Connection Setup Complete" to the radio base station eNB to provide notice of the establishment of the first radio link between the "LTE-AS" and the radio base station eNB.

Here, the "LTE-AS" transmits a "Service Request (the first service request)" to the radio base station eNB based on the "RRC Connection Setup Complete".

In step S1006, the process for returning from the above-mentioned "Preservation state" is complete when the Security procedure is successful.

In step S1007, the radio base station eNB transmits a "Mobility From EUTRA Command (HO) (switching command)" to the "LTE-AS" instructing to perform the Switching process (the handover process or the RAT change process) from a mobile communication system of the LTE scheme to a mobile communication system of the UMTS scheme.

In step S1008, the "LTE-AS" detects that the first radio link is out of synchronization (RLF) within "T304 (the first predetermined period)" after receiving the "Mobility from EUTRA Command (HO)".

In step S1009, the "LTE-AS" performs the cell search process, and in step S1010, detects a cell within the mobile communication system of the UMTS scheme within the predetermined period (T311) in the cell search process.

In step S1011, the mobile station UE is in the "Preservation state", wherein the mobile station UE is location-registered on the mobile communication system of the LTE scheme, an RRC connection (the second radio link) for specific communication between the mobile station UE and a specific connection destination APN is not established between the "UMTS-AS" and the radio access apparatus (the radio control apparatus RNC and the radio base station NB) (RRC Idle), and a connection (bearer) for the specific communication, between the mobile station UE and the specific connection destination APN is established between the first gateway apparatus P-GW and the second gateway apparatus S-GW.

In step S1012, the switching process (RAT change process) is performed from the mobile communication system of the LTE scheme to the UMTS mobile communication system in the mobile station UE.

In step S1013, after the completion of the switching process, the "MM/GMM" carries over the state of the CSFB timer from the "EMM", and along with continuance of the running state of the CSFB timer, carries over the information about the existence of PS signaling, that is, whether or not the mobile station UE was performing a packet communication in the mobile communication system of the LTE scheme before the start of the above-mentioned switching process.

In step S1014, when the "UMTS-AS" detects that it is camping on a cell within the mobile communication system of the UMTS scheme, it provides a "Camping-on notification" indicating the same to the "MM/GMM" in step S1015, and then in step S1017 it provides notice of a "reconnect request" to the "MM/GMM".

In step S1016, the "MM/GMM" transmits the "Camping-on notification" to the "APL".

In step S1018, because the mobile station UE was not performing a packet communication in the mobile communication system of the LTE scheme before the start of the above-mentioned switching process, the "MM/GMM" ignores the received "reconnect request", and does not transmit a "Service Request" in accordance with the "reconnect request" to the "UMTS-AS".

On the other hand, if the mobile station UE was performing a packet communication in the mobile communication system of the LTE scheme before the start of the above-mentioned switching process, the "MM/GMM" transmits a "Service Request" in accordance with the "reconnect request" to the "UMTS-AS" without ignoring the received "reconnect request".

Note that if the CSFB timer expires before the completion of the CSFB operation, the CSFB operation may be terminated.

In step S1019, the "APL" transmits an outgoing call signal for circuit-switched communication to the "MM/GMM".

In step S1020, the "MM/GMM" transmits a "CM Service Request (a service request for circuit-switched communication)" to the "UMTS-AS" in accordance with the received outgoing call signal for circuit-switched communication. Here, the "MM/GMM" stops the CSFB timer.

In step S1021, the "UMTS-AS" establishes an RRC connection (the second radio link) between the radio control apparatus RNC and the radio base station NB (the radio access apparatus of the second communication scheme) by transmitting an "RRC Connection Request" to the radio access apparatus (the radio control apparatus RNC and the radio base station NB) in accordance with the "CM Service Request".

In step S1022, an outgoing call procedure for circuit-switched communication calls is performed between the "MM/GMM" and the radio access apparatus (the radio control apparatus RNC and the radio base station NB).

Secondly, with reference to FIG. 4, a second operation of the mobile communication system according to the first embodiment of the present invention will be explained with an emphasis on a difference from the above-described first operation.

In step S2001, the "APL" requests the start of the circuit-switched communication (that is, requests the performance of the CSFB process) by transmitting "Call Setup (CSFB)" to the "EMM". Here, the "APL" starts the CSFB timer and the "EMM" manages a "CSFB-in-progress state", that is the state in which the CSFB operation is being performed.

Operations from step S2002 through step S2012 are identical to those from step S1002 through step S1012 shown in FIG. 3.

In step S2013, after the completion of the switching process (RAT change process) of step S2012, the "MM/GMM" carries over the "CSFB-in-progress state" from the "EMM", and along with that carries over the information about the existence of PS signaling, that is, whether or not the mobile station UE was performing a packet communication in the mobile communication system of the LTE scheme before the start of the above-mentioned switching process.

Operations from step S2014 through step S2017 are identical to those from step S1014 through step S1017 shown in FIG. 3.

In step S2018, because the CSFB timer has not expired (that is, the "CSFB-in-progress state" is active) and the mobile station UE was not performing a packet communication in the mobile communication system of the LTE scheme before the start of the above-mentioned switching process, the "MM/GMM" ignores the received "reconnect request", and does not transmit a "Service Request" in accordance with the "reconnect request" to the "UMTS-AS".

On the other hand, if the CSFB timer has expired (that is, the "CSFB-in-progress state" is not active) and the mobile station UE has performed a packet communication in the mobile communication system of the LTE scheme before the start of the above-mentioned switching process, the "MM/GMM" transmits a "Server Request" in accordance with the "reconnect request" to the "UMTS-AS" without ignoring the received "reconnect request".

In step S2019, the "APL" transmits an outgoing call signal for circuit-switched communication to the "MM/GMM". Here, the "APL" stops the CSFB timer.

Thirdly, with reference to FIG. 5, an operation during the CSFB process of the "MM/GMM" at the mobile station UE will be explained.

Figure 4:
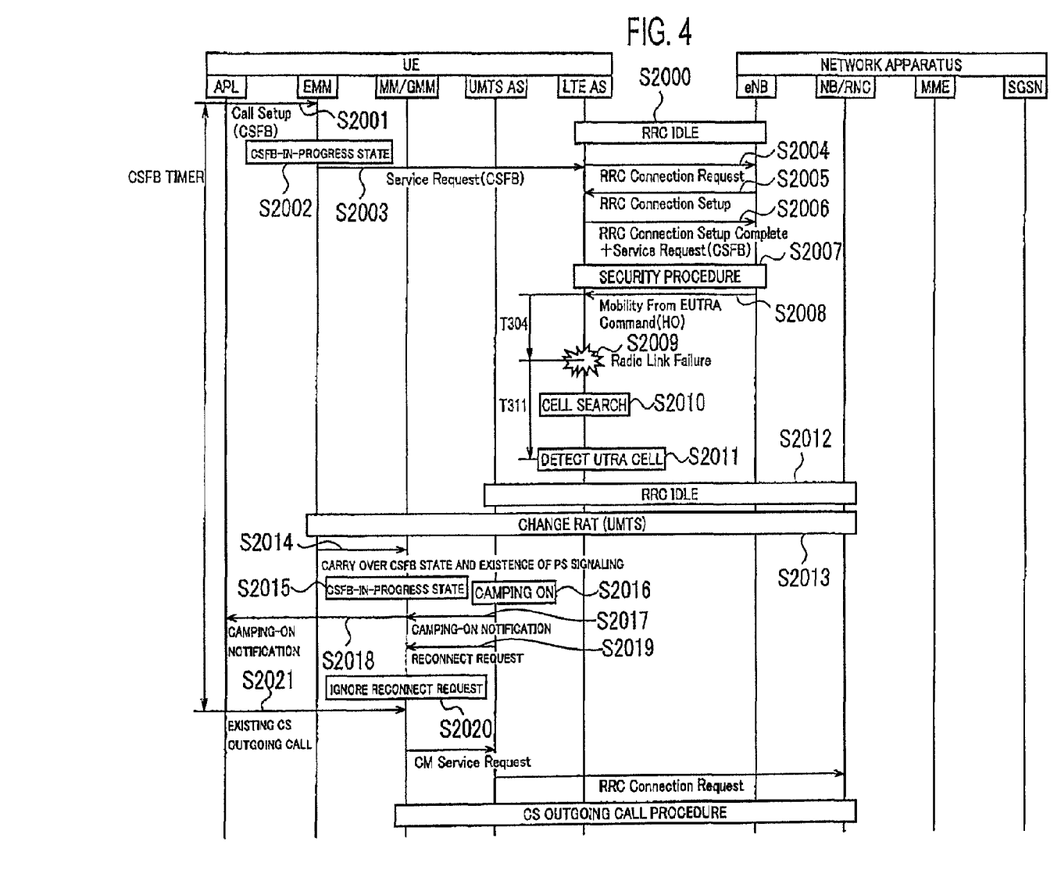
FIG. 4 is a sequence chart showing an operation of the mobile communication system according to the first embodiment of the present invention.
Figure 5:
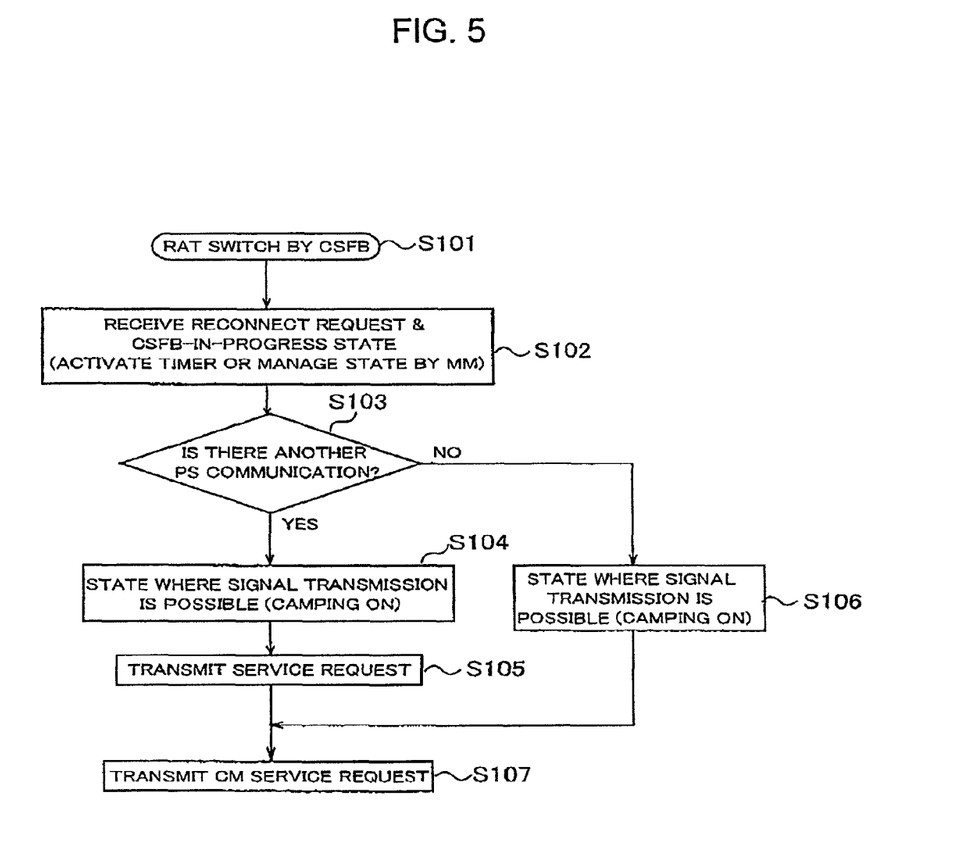
FIG. 5 is a flowchart showing an operation of the mobile station according to the first embodiment of the present invention.

As shown in FIG. 5, in step S101, the "MM/GMM" carries over the control for specific communication between the mobile station UE and a specific connection destination APN from the "EMM" based on the RAT change process (step S1012 in FIG. 3 and step S2010 in FIG. 4).

In step S102, the "MM/GMM" receives the "reconnect request" from the "UMTS-AS" (step S1017 in FIG. 3 and step S2017 in FIG. 4).

Here, the "MM/GMM" manages the situation wherein either the "CSFB-in-progress state" is active or the CSFB timer is running.

In step S103, the "MM/GMM" determines whether or not another packet-switched communication (that is, packet communication other than the packet communication via the VoIP) was being performed in the "EMM" before the RAT change process.

If it is determined that another packet-switched communication was being performed, the "MM/GMM" detects, in step S104, that it is camping on a cell within the mobile communication system of the UMTS scheme, and then in step S105, it transmits a "Service Request" for another packet-switched communication to the "UMTS-AS", and in step S107, it transmits the "CM Service Request" for circuit-switched communication to the "UMTS-AS" in accordance with the outgoing call signal for circuit-switched communication received from the "APL" (step S1020 in FIG. 3 and step S2020 in FIG. 4).

On the other hand, if it is determined that another packet communication was not being performed, the "MM/GMM" detects, in step S106, that it is camping on a cell within the mobile communication system of the UMTS scheme, and then in step S107, instead of transmitting a "Service Request" for another packet-switched communication to the "UMTS-AS" in accordance with the outgoing call signal for circuit-switched communication received from the "APL", it transmits the "CM Service Request" for circuit-switched communication to the "UMTS-AS" (step S1020 in FIG. 3 and step S2020 in FIG. 4).

(Operation and Effect of the Mobile Communication System According to the First Embodiment of the Present Invention)

According to the mobile communication system of the first embodiment of the present invention, because the "MM/GMM" of the mobile station UR is configured to ignore the received "reconnect request", when the CSFB timer has not expired and when the mobile station UE is not perforating a packet communication in the mobile communication system of the LTE scheme before the start of the above-mentioned switching process, it is possible to exhibit effects such as the fact that the unnecessary reconnection process is not performed in the CSFB process, that is, the bearer for unnecessary packet-switched communication is not set.

Further, according to the mobile communication system of the first embodiment of the present invention, by setting a CSFB timer, the process performed at the NAS protocol function side and the process performed at the AS protocol function side can be managed as a series of operations in the CSFB process that requires an outgoing call process spanning the RAT.

Therefore, even when a trouble occurs in the CSFB process, the problem by which an application function or a user is kept waiting for a long time can be solved.

The above-mentioned characteristics of the embodiment may be expressed as follows:

A first aspect of the embodiment is summarized as a mobile communication method in which a mobile station UE location-registered on a mobile communication system of the LTE scheme (first communication scheme) starts a circuit-switched communication in a mobile communication system of the UMTS scheme (second communication scheme) (i.e., a CSFB process is performed), including the steps of: (A) establishing a first radio link between the "LTE-AS (first protocol function for the first communication scheme) at the mobile station UE and the radio base station eNB (radio access apparatus of the first communication scheme) in response to the "Service Request (first service request)" received from the "EMM (second protocol function for the first communication scheme)" at the mobile station UE; (B) transmitting, from the "UMTS-AS (first protocol function for the second communication scheme)" to the "MM/GMM (second protocol function for the second communication scheme)", the "reconnect request (reconnection request)", after the completion of the switching process (handover process or RAT change process) from the mobile communication system of the LTE scheme (first communication scheme) to the mobile communication system of the UMTS scheme (second communication scheme), when the "LTE-AS (first protocol function for the first communication scheme)" detects that a radio link is out of synchronization (RLF) within a first predetermined period after receiving the "Mobility From EUTRA Command (HO) (switching command)" instructing performance of the switching process; (C) not transmitting, from the "MM/GMM (second protocol function for the second communication scheme)" to the "UMTS-AS (first protocol function for the second communication scheme)", the "Service Request (second service request)" responding to the "reconnect request (reconnection request)", when the mobile station UE has not performed a packet communication in the mobile communication system of the LTE scheme (first communication scheme) before a start of the switching process; (D) transmitting, from the "MM/GMM (second protocol function for the second communication scheme)" to the "UMTS-AS (first protocol function for the second communication scheme)", the "CM Service Request (service request for the circuit-switched communication)" in response to a received outgoing call signal for the circuit-switched communication; and (E) establishing a second radio link between the "MM/GMM (second protocol function for the second communication scheme)" and a radio control apparatus RNC and a radio base station NB (radio access apparatus of the second communication scheme) in response to the "CM Service Request (service request for the circuit-switched communication)".

In the first aspect of the embodiment, at the step (C), when the CSFB timer (predetermined timer) has not expired and the mobile station UE has not performed the packet communication in the mobile communication system of the LTE scheme (first communication scheme) before a start of the switching process, it may be possible that the "MM/GMM (second protocol function for the second communication scheme)" does not transmit the "Service Request (second service request)" responding to a "reconnect request (reconnection request)" to the "UMTS-AS (first protocol function for the second communication scheme)", and the "EMM (second protocol function for the first communication scheme)" starts the CSFB timer (predetermined timer) at a time point at which the "Service Request (first service request)" has been transmitted by the "EMM (second protocol function for the first communication scheme)", and, after the completion of the switching process, the "MM/GMM (second protocol function for the second communication scheme)" carries over the state of the CSFB timer (predetermined timer) from the "EMM (second protocol function for the first communication scheme)", and the "MM/GMM (second protocol function for the second communication scheme)" stops the CSFB timer (predetermined timer) at a time point at which the "CM Service Request (service request for the circuit-switched communication)" has been transmitted.

In the first aspect of the embodiment, at the step (C), when the CSFB timer (predetermined timer) has not expired and the mobile station UE has not performed the packet communication in the mobile communication system of the LTE scheme (first communication scheme) before a start of the switching process, it may be possible that the "MM/GMM (second protocol function for the second communication scheme)" does not transmit the "Service Request (second service request)" responding to the "reconnect request (reconnection request)" to the "UMTS-AS (first protocol function for the second communication scheme)", and the APL (application function) starts the CSFB timer (predetermined timer) at a time point at which the "EMM (second protocol function for the first communication scheme)" has been requested to start the circuit-switched communication, and the "APL (application function)" stops the CSFB timer (predetermined timer) at a time point at which the outgoing call signal for the circuit-switched communication has been transmitted to the "MM/GMM (second protocol function for the second communication scheme)".

A second aspect of the embodiment is summarized as a mobile station UE including: the "LTE-AS (first protocol function for the first communication scheme)"; the "EMM (second protocol function for the first communication scheme)"; the "UMTS-AS (first protocol function for the second communication scheme)"; and the "MM/GMM (second protocol function for the second communication scheme)", wherein the "LTE-AS (first protocol function for the first Communication scheme)" is configured to establish a first radio link with the radio base station eNB (radio access apparatus of the first communication scheme), in response to the "Service Request (first service request)" received from the "EMM (second protocol function for the first communication scheme)"; and, when the "LTE-AS (first protocol function for the first communication scheme)" detects that the first radio link is out of synchronization (RLF) within a first predetermined period after receiving the "Mobility From EUTRA Command (HO) (switching command)" instructing performance of a switching process from the mobile communication system of the LTE scheme (first communication scheme) to the mobile communication system of the UMTS scheme (second communication scheme), the "UMTS-AS (first protocol function for the second communication scheme)" is configured to transmit, after the completion of the switching process, the "reconnect request (reconnection request)" to the "MM/GMM (second protocol function for the second communication scheme)"; when the mobile station UE has not performed a packet communication in the mobile communication system of the LTE scheme (first communication scheme) before a start of the above-mentioned switching process, the "MM/GMM (second protocol function for the second communication scheme)" is configured to not transmit the "Service Request (second service request)" responding to the "reconnect request (reconnection request)" to the "UMTS-AS (first protocol function for the second communication scheme)"; the "MM/GMM (second protocol function for the second communication scheme)" is configured to transmit, in response to a received outgoing call signal for the circuit-switched communication, the "CM Service Request (service request for the circuit-switched communication)" to the "UMTS-AS (first protocol function for the second communication scheme)"; and the "MM/GMM (second protocol function for the second communication scheme)" is configured to establish, in response to the "CM Service Request (service request for the circuit-switched communication)", a second radio link with the radio control apparatus RNC and the radio base station NB (radio access apparatus of the second communication scheme).

In the second aspect of the embodiment, when the CSFB timer (predetermined timer) has not expired and the mobile station UE has not performed the packet communication in the mobile communication system of the LTE scheme (first communication scheme) before a start of the above-mentioned switching process, it may be possible that the "MM/GMM (second protocol function for the second communication scheme)" does not transmit the "Service Request (second service request)", in response to the "reconnect request (reconnection request)", to the "UMTS-AS (first protocol function for the second communication scheme)"; the "EMM (second protocol function for the first communication scheme)" starts the CSFB timer (predetermined timer) at a time point at which the "Service Request (first service request)" has been transmitted; and the "MM/GMM (second protocol function for the second communication scheme)" carries over, after the completion of the switching process, the state of the CSFB timer (predetermined timer) from the "EMM (second protocol function for the first communication scheme)", and the "MM/GMM (second protocol function for the second communication scheme)" stops the CSFB timer (predetermined timer) at a time point at which the "CM Service Request (service request for the circuit-switched communication)" has been transmitted.

In the second aspect of the embodiment, when the "APL (application function)" is further provided, the CSFB timer (predetermined timer) has not expired, and the mobile station UE has not performed the packet communication in the mobile communication system of the LTE scheme (first communication scheme) before a start of the above-mentioned switching process, it may be possible that the "MM/GMM (second protocol function for the second communication scheme)" does not transmit the "Service Request (second service request)", in response to the "reconnect request (reconnection request)", to the "UMTS-AS (first protocol function for the second communication scheme)"; and the "APL (application function)" starts the CSFB timer (predetermined timer) at a time point at which the "EMM (second protocol function for the first communication scheme)" has been requested to start a circuit-switched communication; and the "APL (application function)" stops the CSFB timer (predetermined timer) at a time point at which an outgoing call signal for the circuit-switched communication has been transmitted to the "MM/GMM (second protocol function for the second communication scheme)".

A third aspect of the embodiment is summarized as a mobile communication method in which a mobile station UE location-registered on a mobile communication system of the LTE scheme (first communication scheme) starts a circuit-switched communication in a mobile communication system of the UMTS scheme (second communication scheme) (i.e., a CSFB process is performed), including the steps of: transmitting, from the "EMM (second protocol function for the first communication scheme)" to the "LTE-AS (first protocol function for the first communication scheme)", the "Service Request (CSFB) (first service request)" requesting to start the circuit-switched communication in the mobile communication system of the UMTS scheme (second communication scheme), and starting the CSFB timer (predetermined timer) at the mobile station UE; transmitting, from the "LTE-AS (first protocol function for the first communication scheme)" to the radio base station eNB (radio access apparatus of the first communication scheme), the "Service Request (CSFB) (first service request)" in response to the "Service Request (CSFB) (first service request)", after establishing an RRC connection (first radio link) between the "LTE-AS (first protocol function for the first communication scheme)" and the radio base station eNB (radio access apparatus of the first communication scheme) at the mobile station UE; performing, at the "LTE-AS (first protocol function for the first communication scheme)", a cell search process without stopping the CSFB timer (predetermined timer) to detect a cell (UTRA cell) in the mobile communication system of the UMTS scheme (second communication scheme), when detecting that the RRC connection (first radio link) is out of synchronization (RLF), after receiving the "Mobility From EUTRA Command (HO) (switching command)" instructing performance of the switching process from the mobile communication system of the LTE scheme (first communication scheme) to the mobile communication system of the UMTS scheme (second communication scheme) at the mobile station UE; transmitting, from the "MM/GMM (second protocol function for the second communication scheme)" to the "UMTS-AS (first protocol function for the second communication scheme)", the "CM Service Request (service request for the circuit-switched communication)" to stop the CSFB timer (predetermined timer), when the switching process from the mobile communication system of the LTE scheme (first communication scheme) to the mobile communication system of the UMTS scheme (second communication scheme) has been performed before expiration of the CSFB timer (predetermined timer) at the mobile station UE; and establishing the RCC connection (second radio link) between the "UMTS-AS (first protocol function for the second communication scheme)" and the radio control apparatus RNC and the radio base station NB (radio access apparatus of the second communication scheme) in response to the "CM Service Request (service request for the circuit-switched communication)".

A fourth aspect of the embodiment is summarized as a mobile station UE including: the "LTE-AS (first protocol function for a first communication scheme)"; the "EMM (second protocol function for the first communication scheme)"; the "UMTS-AS (first protocol function for a second communication scheme)"; the "MM/GMM (second protocol function for the second communication scheme)"; and the "CSFB timer (predetermined timer)", wherein the "EMM (second protocol function for the first communication scheme)" is configured to transmit a "Service Request (CSFB) (first service request)" requesting to start a circuit-switched communication in a mobile communication system of the UMTS scheme (second communication scheme), to the "LTE-AS (first protocol function for the first communication scheme)" and start the CSFB timer (predetermined timer); the "LTE-AS (first protocol function for the first communication scheme)" is configured to transmit, after establishing an RRC connection (first radio link) with the radio base station eNB (radio access apparatus of the first communication scheme) in response to the "Service Request (CSFB) (first service request)", the "Service Request (CSFB) (first service request)" to the radio base station eNB (radio access apparatus of the first communication scheme); when the "LTE-AS (first protocol function for the first communication scheme)", after receiving the "Mobility From EUTRA Command (HO) (switching command)" instructing performance of the switching process from the mobile communication system of the LTE scheme (first communication scheme) to the mobile communication system of the UMTS scheme (second communication scheme), detects that the RRC connection (first radio link) is out of synchronization (RLF), the "LTE-AS (first protocol function for the first communication scheme)" is configured to perform a cell search process without stopping the CSFB timer (predetermined timer) to detect a cell (UTRA cell) in the mobile communication system of the UMTS scheme (second communication scheme); when the switching process from the mobile communication system of the LTE scheme (first communication scheme) to the mobile communication system of the UMTS scheme (second communication scheme) has been performed before expiration of the CSFB timer (predetermined timer), the "MM/GMM (second protocol function for the second communication scheme)" is configured to transmit the "CM Service Request (service request for the circuit-switched communication)" to the "UMTS-AS (first protocol function for the second communication scheme)" to stop the CSFB timer (predetermined timer); and, in response to the "CM Service Request (service request for the circuit-switched communication)", the "UMTS-AS (first protocol function for the second communication scheme)" is configured to establish the RCC connection (second radio link) with the radio control apparatus RNC and the radio base station NB (radio access apparatus of the second communication scheme).

Note that operation of the above described mobile station UE, the radio base station eNB/NB, the radio control apparatus RNC and the mobile switching center MME/SGSN may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB/NE, the radio control apparatus RNC and the mobile switching center MME/SGSN. Also, the storage medium and the processor may be provided in the mobile station UE, the radio base station eNB/NB, the radio control apparatus RNC and the mobile switching center MME/SGSN as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station location-registered on a mobile communication system of a first communication scheme starts a circuit-switched communication in a mobile communication system of a second communication scheme, comprising the steps of:

transmitting, from a second protocol function for the first communication scheme to a first protocol function for the first communication scheme, a first service request to request to start the circuit-switched communication in the mobile communication system of the second communication scheme, and starting a predetermined timer, at the mobile station;

transmitting, from the first protocol function for the first communication scheme to a radio access apparatus of the first communication scheme, the first service request, after establishing a first radio link between the first protocol function for the first communication scheme and the radio access apparatus of the first communication scheme, at the mobile station; and stopping, at the first protocol function for the first communication scheme, a predetermined timer, after detecting a radio link failure of the first radio link after receiving a switching command instructing performance of a switching process from the mobile communication system of the first communication scheme to the mobile communication system of the second communication scheme, at the mobile station.

2. A mobile station comprising:

a first protocol function for a first communication scheme;

a second protocol function for the first communication scheme;

a first protocol function for a second communication scheme;

a second protocol function for the second communication scheme; and a predetermined timer, wherein the second protocol function for the first communication scheme is configured to transmit, to the first protocol function for the first communication scheme, a first service request requesting to request to start a circuit-switched communication in a mobile communication system of the second communication scheme, and to activate the predetermined timer;

the first protocol function for the first communication scheme is configured to transmit, to a radio access apparatus of the first communication scheme, the first service request in response to the first service request, after establishing a first radio link with the radio access apparatus of the first communication scheme; and the first protocol function for the first communication scheme is configured to stop the predetermined timer, after detecting a radio link failure of the first radio link after receiving a switching command instructing performance of a switching process from the mobile communication system of the first communication scheme to the mobile communication system of the second communication scheme.

* * * * *